United States Patent [19]
Arnett et al.

[11] 3,713,377
[45] Jan. 30, 1973

[54] BEVERAGE BREWING DEVICE
[75] Inventors: Hager F. Arnett, Mansfield; Reginald A. Smith, Shelby, both of Ohio
[73] Assignee: Mansfield Aircraft Products Co., Mansfield, Ohio
[22] Filed: March 8, 1971
[21] Appl. No.: 122,107

[52] U.S. Cl. .........................99/283, 99/289, 99/295
[51] Int. Cl. ...............................................A47j 31/44
[58] Field of Search........99/295, 289, 299, 300, 302, 99/307, 280, 282, 283

[56] References Cited

UNITED STATES PATENTS

| | | | |
|---|---|---|---|
| 2,883,922 | 4/1959 | Andres | 99/295 |
| 3,470,812 | 10/1969 | Levinson | 99/295 |
| 2,939,381 | 6/1960 | McBride | 99/295 |
| 2,952,202 | 9/1960 | Renner | 99/295 |

Primary Examiner—Robert W. Jenkins
Attorney—Meyer, Tilberry & Body

[57] ABSTRACT

A beverage brewing device includes an infusion station for receiving an infusion package. The infusion station includes a pair of vertically spaced package engaging members, at least one of which is movable toward the othermember to an infusing position, and away from the other member to a package loading and unloading position. Liquid supply means feeds liquid to the infusion station when the one member is in the infusing position. An electric motor moves the one member, and automatic sensing means senses a predetermined volume of liquid which has passed the infusion station to energize the motor for moving the one member from the infusing position to the loading and unloading position.

30 Claims, 9 Drawing Figures

BEVERAGE BREWING DEVICE

BACKGROUND OF THE INVENTION

This application pertains to the art of infusion and more particularly to infusion of beverages. The invention is particularly applicable to brewing of coffee and will be described with particular reference thereto although it will be appreciated that the invention has broader applications and may be used for brewing other beverages.

Beverage brewers of a known type include an infusion station to which water is supplied for making a beverage. In such devices, the infusion station includes an upper infusion package piercing means positioned above a vertically movable horizontal infusion package piercing and supporting platform. With the infusion package supporting platform in its lowermost position, an infusion package is placed upon the platform. A manually operated lever is then thrown to raise the supporting platform and pierce the infusion package. Manual operation is very inefficient as it requires time consuming attention of an operator.

SUMMARY

A device of the type described is provided with an electric motor drivingly connected with the infusion package supporting platform for driving the platform upward to the infusing position, and for lowering the supporting platform to the infusion package loading and unloading position.

In accordance with a preferred arrangement, automatic controls are provided so that an operator merely pushes a single button to energize the infusion device. After the initial manual energization, the device automatically proceeds through a complete cycle of raising the supporting platform to the infusing position; supplying liquid to the infusing station; shutting off the supply of liquid after a predetermined volume has been fed past the infusing station; and automatically lowering the supporting platform to the infusion package loading and unloading position.

It is a principal object of the present invention to provide an improved beverage brewing device which is economical to manufacture and very simple to operate.

It is another object of the present invention to provide an improved beverage brewing device which is completely automatic in operation.

It is an additional object of the present invention to provide an improved beverage brewing device having a very simple and reliable mechanism for raising and lowering an infusion package platform.

It is also an object of the present invention to provide an improved beverage brewing device which substantially eliminates inefficient manual operation and time consuming attention of an operator.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

DESCRIPTION OF THE PREFERRED EMBODIMENT

Figure 1:
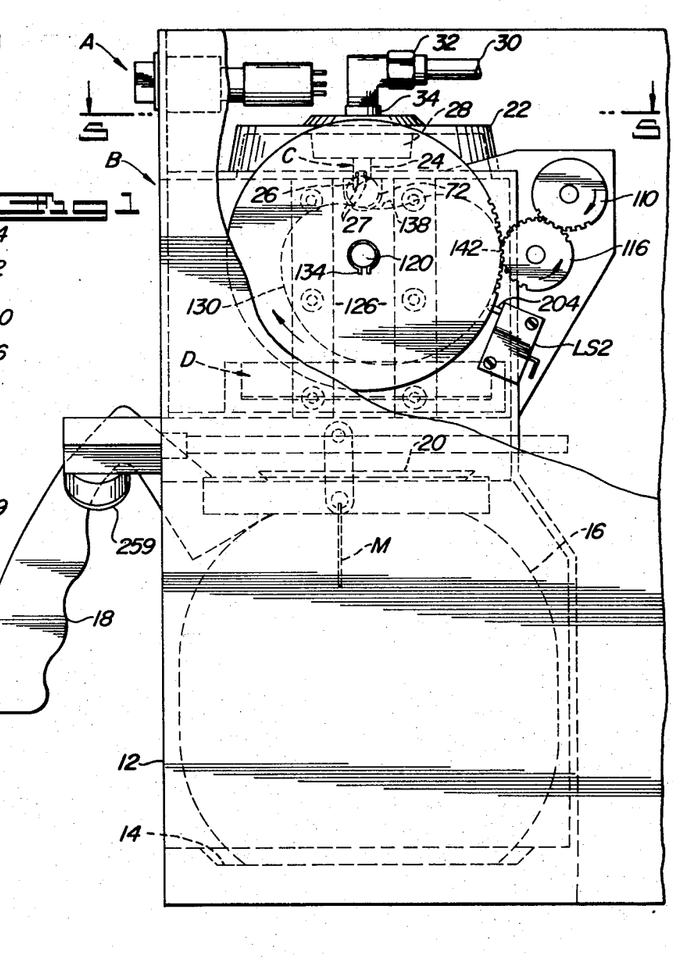
FIG. 1 is a side elevational view of a beverage brewing device having the improvements of the present invention incorporated therein.

Referring now to the drawings, wherein the showings are for purposes of illustrating the preferred embodiment of the invention only and not for purposes of limiting same, FIG. 1 shows a beverage brewing device A which includes a housing or support frame B.

Housing or support frame B includes a lower recessed portion 12 having a bottom support 14. A brewed beverage decanter or receptacle 16 is receivable in recessed portion 12 and rests on bottom support surface 14. Receptacle 16 is of conventional construction, and includes a gripping handle 18 and an open top 20.

In accordance with one arrangement, upper portion 22 of support frame B defines a first member and has a centrally located piercing means C secured thereto. Piercing means C includes a downwardly projecting hollow tube 24 having a pointed tip 26 and a plurality of small, radially extending, and circumferentially spaced openings 27 through which liquid may flow. A substantially cylindrical elastomeric sealing member 28 has a suitable centrally located hole formed therein for receiving tube 24 therethrough. The centrally located hole in elastomeric sealing member 28 is preferably of slightly smaller diameter than tube 24 so that elastomeric sealing member 28 will be in tight sealing engagement around tube 24. Elastomeric sealing member 28 engages the lower surface of upper portion 22, and tube 24 projects downwardly through elastomeric sealing member 28 as shown in FIG. 1. Conduit means 30, connected with a supply of water in a known manner, is also connected by suitable couplings 32 and 34 with tube 24 in a conventional manner. Water may then flow through conduit 30 from the supply source and through openings 27 in tube 24.

Positioned below first member 22, for vertical movement toward and away from first member 22, is a second member D defining an infusion package supporting platform. Platform D includes a bottom wall 38 and an upstanding peripheral wall 40. Upstanding wall 40 extends over 180° to provide an opening between its terminal ends 42 and 44. Adjacent terminal ends 42 and 44 of upstanding wall 40, bottom wall 38 has thicker portions 46 and 48 to define arcuate upstanding wall portions 50 and 52. Bottom wall 38 further has an elongated slot 54 formed therein. A pair of spaced-apart upstanding arms 56 and 58 are suitably secured to upstanding wall 40 as by screws or welding. Entire platform D may be a one piece casting of aluminum or the like if so desired. Arms 56 and 58 have brackets 60 and 62 secured to the upper ends thereof as by screws 64 which extend through suitable holes in brackets 60 and 62, and thread into threaded bores on the upper ends of arms 56 and 58. Each bracket 60 and 62 supports a shaft 66 and 68 on which rollers are rotatably mounted to define cam followers 70 and 72.

Opposite side walls 74 and 76 of frame B have centrally located slots 78 and 80 extending downwardly from the upper edges thereof. Pairs of guide members 81 are secured to the internal surfaces of side walls 74 and 76. Each guide member 81 includes a central groove 83 defining a pair of spaced apart guides 82 and 84 positioned in spaced apart relationship on opposite sides of slots 78 and 80. Guides 82 and 84 of guide member 81 are provided with suitable holes 86 through which screws 88 extend and thread into threaded bores 90 in side walls 74 and 76. Brackets 60 and 62, and cam followers 70 and 72, extend through slots 78 and 80 in side walls 74 and 76, while upright arms 56 and 58 are received in grooves 83 between guides 82 and 84 for vertical sliding movement. Each guide member 81 includes an upper arcuate notch 85 into which the bottom portion of brackets 60 and 62 may be received in the lowermost position of platform D.

In accordance with a preferred arrangement, a pan E is provided for receiving an infusion package F. Pan E includes an upstanding circular side wall 92 defining an open top 94 for pan E. Bottom wall 96 of pan E is provided with a plurality of upstanding piercing elements 98 for piercing the bottom of an infusion package F positioned in pan E. Bottom wall 96 of pan E further includes a centrally located outlet opening 102 which is receivable in slot 54 of platform D. Pan E is provided with a suitable handle 104 so that pan E can be easily placed on platform D or removed therefrom. With an infusion package F received in pan E, pan E is positionable on bottom wall 38 of platform D within arcuate wall portions 50 and 52 of platform D. It will now be apparent that an infusion station G is defined between piercing element C and supporting platform D.

In accordance with the preferred embodiment, an electric motor H is suitably mounted on rear wall 108 of frame B. The output shaft of motor H drives a gear box 1 having an output drive gear 110. A drive shaft 112 is rotatably mounted on frame B rearwardly of supporting platform D, and has a pair of drive gears 114 and 116 mounted on opposite end portions thereof outwardly of side walls 74 and 76. Output drive gear 110 meshes with drive gear 116 to supply torque for rotating drive shaft 112. A pair of stub shafts 120 and 122 are mounted on side walls 74 and 76 below slots 78 and 80. Stub shafts 120 and 122 rotatably receive driven gears 124 and 126, and cams 128 and 130. Cams 128 and 130 may be molded integrally with driven gears 124 and 126 of plastic material if so desired. However, it will be recognized that the cams may be made separately and of other materials, and secured to the inner faces of gears 124 and 126 as by screws. Gears 124 and 126, and cams 128 and 130, are rotatably retained on stub shafts 120 and 122 as by C-rings 132 and 134 received in suitable circumferential grooves formed in stub shafts 120 and 122. Cams 128 and 130 are positioned beneath cam followers 70 and 72 on arms 56 and 58 of infusion package supporting platform D. Therefore, cam followers 70 and 72 ride on the outer peripheries of cams 128 and 130 during rotation of the cams. Cams 128 and 130 each have a low point portion 136 and 138, and a high point portion 140 and 142.

Figure 2:
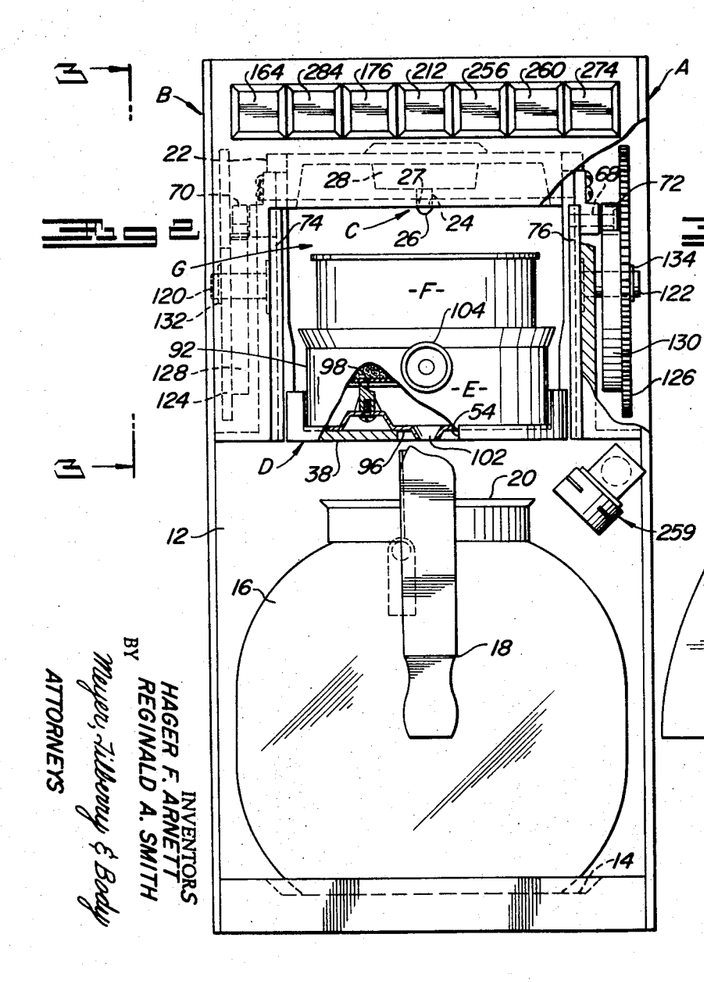
FIG. 2 is a front elevational view of a beverage brewing device having the improvements of the present invention incorporated therein.
Figure 3:
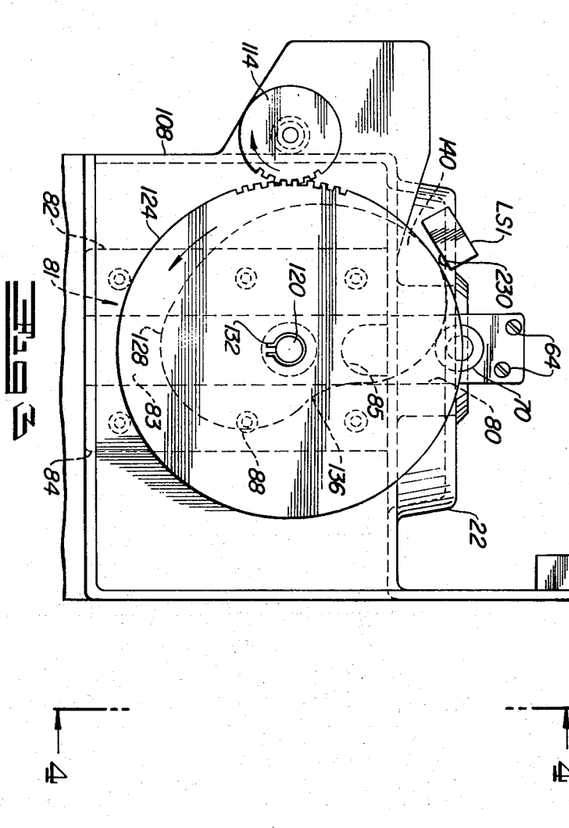
FIG. 3 is a side elevational view looking in the direction of arrows 3—3 of FIG. 2, with the housing cut away for clarity of illustration, and with the infusion package supporting platform in a raised position.
Figure 4:
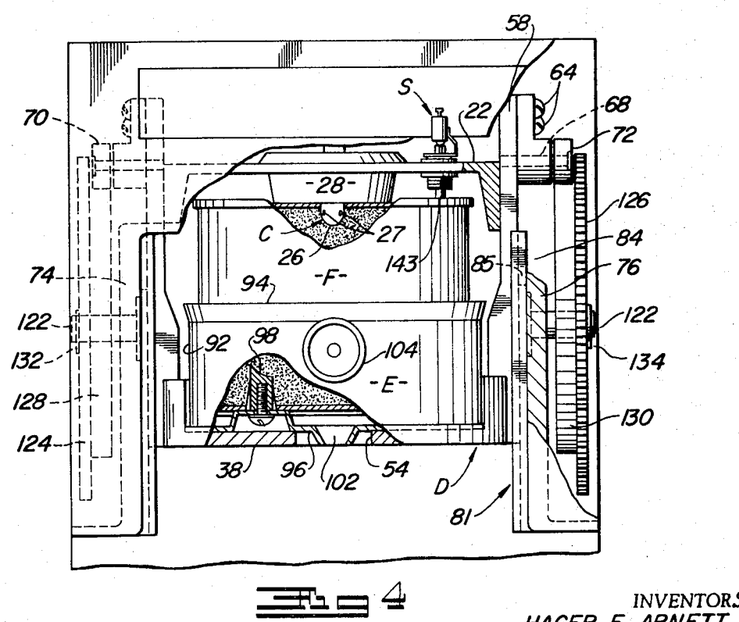
FIG. 4 is a front elevational view looking in the direction of arrows 4—4 of FIG. 3, with a portion of the housing cut away for clarity of illustration, and with the infusion package supporting platform in a raised position.
Figure 5:
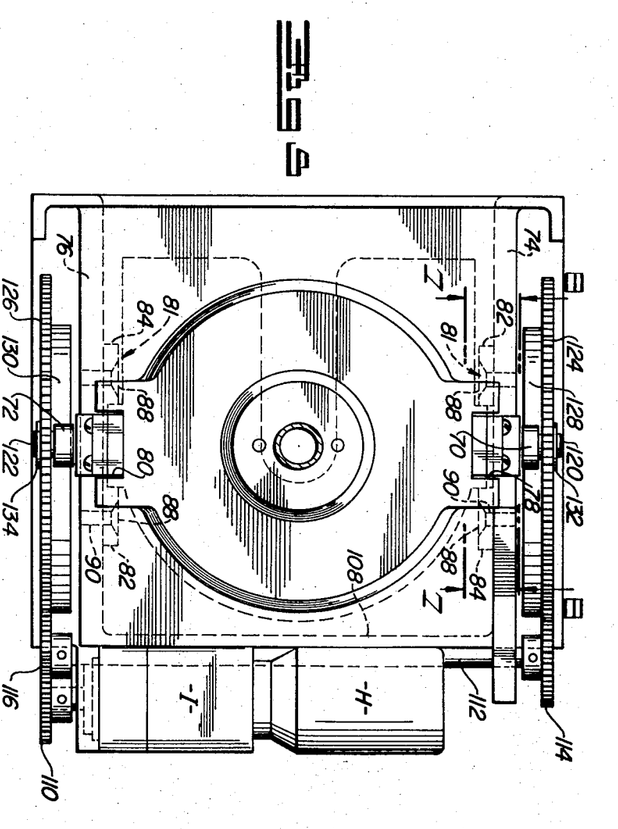
FIG. 5 is a top plan view looking in the direction of arrows 5—5 of FIG. 1.
Figure 6:
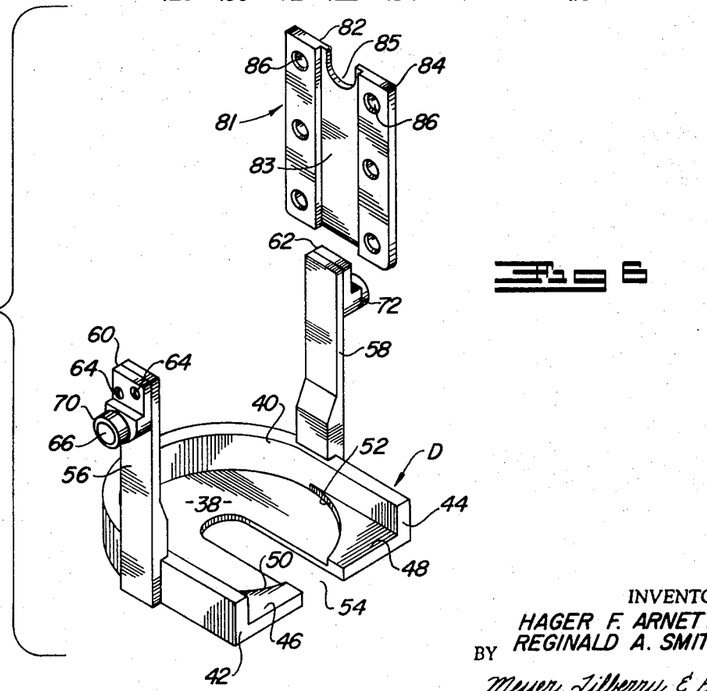
FIG. 6 is a perspective illustration showing the infusion package supporting platform used with the beverage brewing device.
Figure 7:
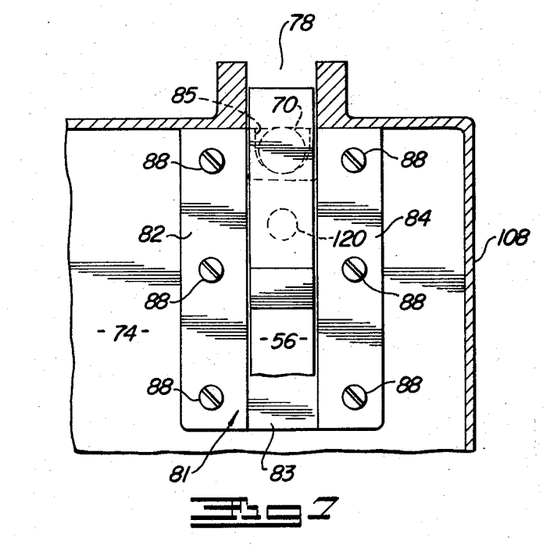
FIG. 7 is a sectional elevational view looking in the direction of arrows 7—7 of FIG. 5.
Figure 8:
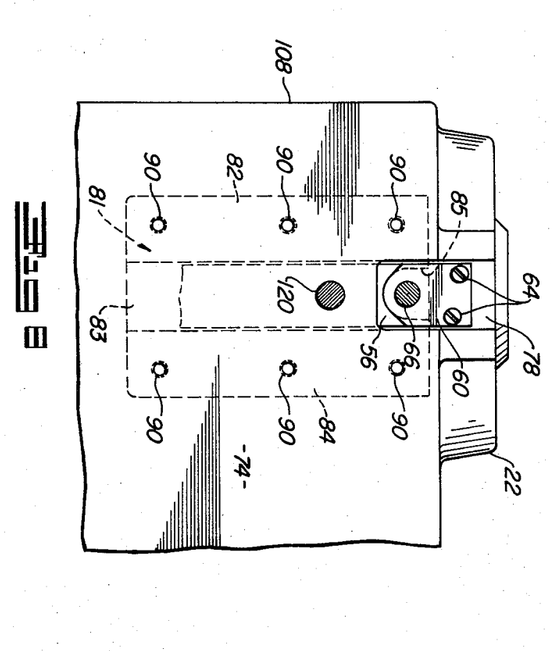
FIG. 8 is a sectional elevational view looking in the direction of arrows 8—8 of FIG. 5; and, FIG. 9 is a diagramatic circuit diagram of the control circuit used with the improved beverage brewing device of the present invention.

With cam followers 70 and 72 resting on low point portions 136 and 138 of cams 128 and 130, infusion package supporting platform D is in its lowermost position shown in FIGS. 1 and 2. This lowermost position of supporting platform D defines an infusion package loading and unloading position. When pan E containing an infusion package F is positioned on supporting platform D as shown in FIG. 2, energization of motor H to drive driven gear 124 on cam 128 counterclockwise as viewed in FIG. 3, and to drive driven gear 126 on cam 130 clockwise as viewed in FIG. 1, will move supporting platform D vertically upward to the position shown in FIG. 4. Piercing element C will then pierce the upper surface of infusion package F and piercing elements 98 in the bottom of pan E will pierce the bottom of infusion package F. The top surface of infusion package F will be sealed against sealing member 28. Water supplied through outlets 27 of piercing element C will then flow through infusion package F and out the holes in the bottom of infusion package F formed by piercing elements 98. This infusion of water through the beverage contained within infusion package F will form a beverage which flows through outlet opening 102 in bottom wall 96 of pan E and into receptacle 16. With platform D raised to its uppermost position, as shown in FIG. 4, supporting platform D is in an infusing position, and cam followers 70 and 72 rest on high point portions 140 and 142 of cams 128 and 130.

In accordance with a preferred arrangement, a detector switch S is mounted on upper portion 22 of frame B to detect the presence of infusion package F. In the absence of an infusion package F supported on platform D, the control circuit will not operate to cause liquid to flow through tube 24. Detector switch S includes an actuator 143 which is struck by the top of infusion package F in the uppermost position of platform D to actuate switch S.

Figure 9:
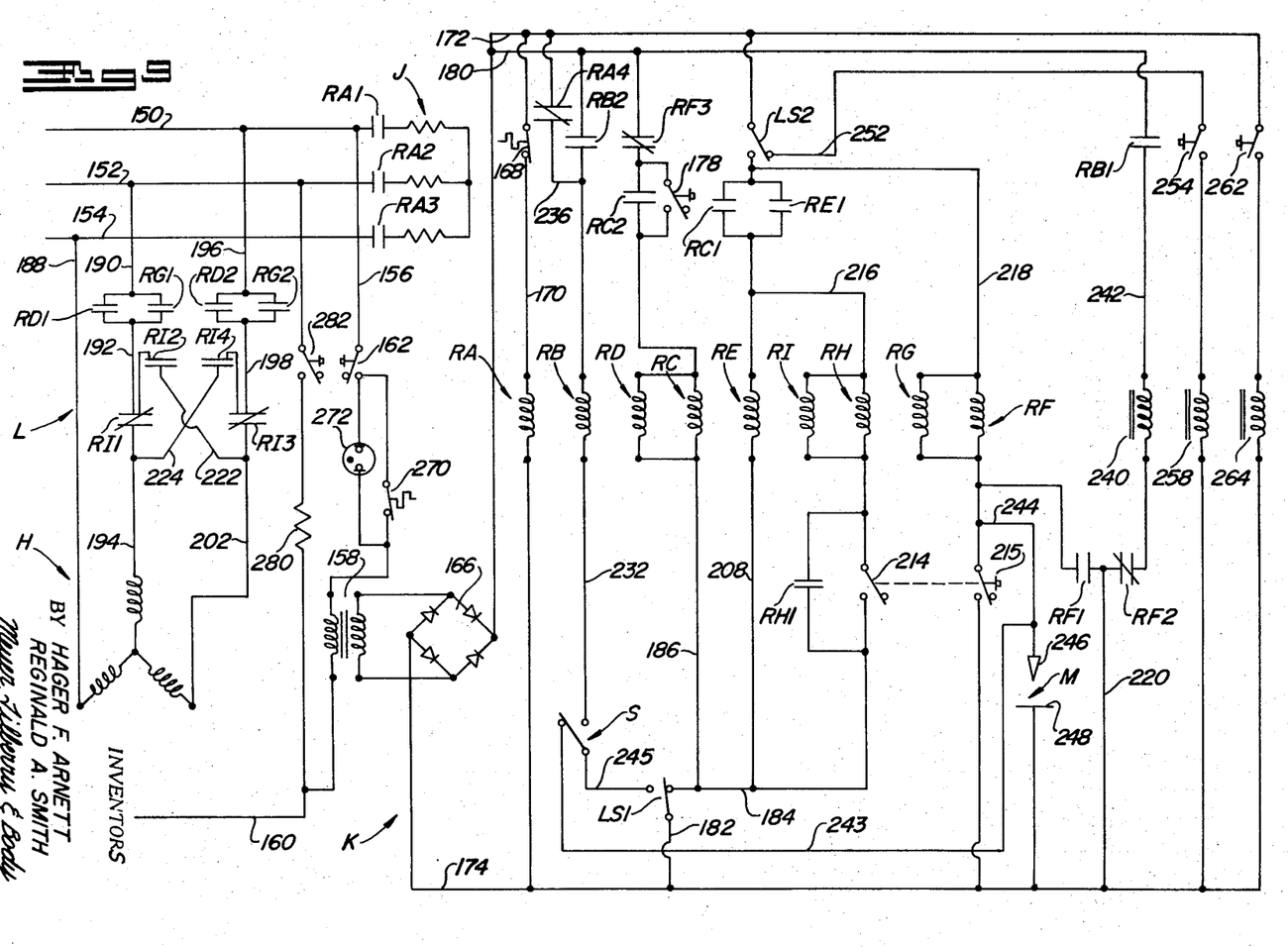

On arrangement of a control circuit for operating the infusion device of the present invention is shown in FIG. 9. Electric emersion heaters J are connected through lines 150, 152 and 154 with a conventional three-phase power supply commonly used on an aircraft. Electric emersion heaters J are positioned in a tank forming part of the infusion device for heating water in the tank. Line 156 connects transformer 158 to line 150 and neutral line 160 through main on-off switch 162. To begin operation of the device, main on-off button 164 on the front of infusion device A in FIG. 2 depressed to close main on-off switch 162. Current is then supplied to main control circuit K through transformer 158 and bridge circuit 166. Current is also supplied to relay RA and single pole normally closed control thermostat 168 which are connected in series in line 170 across lines 172 and 174 leading from bridge circuit 166. Energization of relay RA then closes normally open contacts RA1, RA2 and RA3 which are located respectively in lines 150, 152 and 154 in series with emersion heaters J. This begins heating of water in the tank containing the emersion heaters for infusion device A. An infusion package F is then placed in pan E and pan E is positioned on platform D which is in its lowermost position as shown in FIG. 2. It will be understood that infusion package F in pan E could be positioned on platform D prior to energization of the emersion heaters. Following positioning of an infusion package on platform D and closing of main on-off switch 162 by depressing main on-off button 164, brew button 176 is pressed to close normally open momentary-on switch 178 which is connected across lines 174 and 180 through lines 182, 184 and 186. Current then flows through normally closed limit switch LS1, relays RC and RD, momentary switch 178 and normally closed contact RF3 of relay RF which remains unenergized. Releasing manual pressure on brew button 176 then causes momentary switch 178 to open and a holding circuit is established due to prior energization of relay RC which closes normally open contact RC2 for maintaining relays RC and RD energized. Energization of relay RD closes normally open contacts RD1 and RD2 in motor control circuit L. Current is then supplied to motor H from line 154 through line 188; from line 152 through line 190, closed contact RD1, line 192, normally closed contact RI1 and line 194; from line 150 through line 196, normally open closed contact RD2, line 198, normally closed contact RI3 and line 202.

Motor H is then energized to rotate output drive gear 110 clockwise as viewed in FIG. 1. This causes rotation of drive gear 116 counterclockwise as viewed in FIG. 1, and drive gear 114 clockwise as viewed in FIG. 3. Gear 126 and cam 130 are then driven clockwise as viewed in FIG. 1 and gear 124 and cam 128 are driven counterclockwise as viewed in FIG. 3. Rotation of cams 128 and 130 by motor H then raises infusion package supporting platform D to the position shown in FIG. 4 by cooperation between cams 128 and 130, and cam followers 70 and 72. Infusion package F is then pierced by piercing element C and elements 98.

Shortly after beginning rotation of cam 130, actuator 204 of limit switch LS2 in FIG. 1 becomes free from contact with the periphery of cam 130 so that switch LS2 can assume its normally closed position. Current is then supplied to relay RE which is located in line 208 connected across lines 172 and 184. Current flows through limit switch LS2 and closed normally open contact RC1 of relay RC to relay RE. Energization of relay RE also closes normally open contact RE1. In the event that pan E has been improperly positioned on platform D, or the operator views some other malfunction prior to platform D reaching the fully raised position of FIG. 4, it is possible to stop operation of the device and move platform D back to the loading and unloading position shown in FIG. 2 by pressing stop button 212 of FIG. 2. This closes momentary contacts 214 and 215. Momentary contact 214 is in parallel with relay RE through line 216 and in series with relays RH and RI. Energization of relay RH closes normally open contact RH1 which is in parallel with momentary contact 214 to establish a holding circuit for relays RH and RI. Release of button 212 and opening of momentary contact 214 will still maintain relays RH and RI energized through closed contact RH1. The simultaneous closing of momentary contact 215 also energizes relays RF and RG through line 218. Energization of relay RF closes normally open contact RF1 in line 220 to establish a holding circuit for relays RF and RG when momentary contact 215 is opened. Energization of relay RF will open normally closed contact RF3 in line 186 to de-energize relays RC and RD. This opens contacts RD1 and RD2 in motor control circuit L. Energization of relay RG closes normally open contacts RG1 and RG2 in motor control circuit L. Energization of relay RI opens normally closed contacts RI1 and RI3, and closes normally open contacts RI2 and RI4. This reverses the direction of current flow to motor H so that motor H will rotate in a reverse direction to move platform D downward to the loading and unloading position. Current flows from line 154 through line 188 to motor H; from line 152 through line 190, closed normally open contact RG1, line 192, closed normally open contact RI2, lines 222 and 202; from line 150 through line 196, closed normally open contact RG2, line 198, closed normally open contact RI4, and lines 224 and 194. Gear 124 and cam 128 will then rotate in a clockwise direction as viewed in FIG. 3, while gear 126 and cam 130 rotate in a counterclockwise direction as viewed in FIG. 1. Platform D will then move downward to the loading and unloading position shown in FIG. 2 until cam 130 strikes actuator 204 of switch LS2 and moves switch LS2 to its second position. All of relays RF, RG, RH and RI will then be de-energized so that motor H will stop.

In the event there is no malfunction, momentary button 212 will not be pushed and motor H will remain energized through contacts for relays RC and RD as previously described. Upon platform D reaching its full upward infusing position as shown in FIG. 4, high point portion 140 of cam 128 in FIG. 3 will strike actuator 230 of limit switch LS1 to move switch LS1 to its second position. Limit switch LS1 then establishes a circuit from line 182 to line 232 containing relay RB and detector switch S. Current is then no longer supplied to line 186 so that relays RC and RD are de-energized to stop operation of motor H. Infusion package F will move normally open detector switch S to its closed position in circuit with line 232. Upon the temperature of the water reaching the desired level set by thermostat 168, thermostat 168 opens and de-energizes relay RA. De-energization of relay RA then opens normally open contacts RA1, RA2 and RA3 to de-energize emersion heaters J. De-energization of relay RA closes normally closed contact R4 to establish a circuit through contact R4 in line 236, relay RB, line 232, detector switch S, switch LS1 and line 182. Energization of relay RB closes normally open contact RB2 to establish a holding circuit for relay RB in the event the water temperature drops momentarily and thermostat 168 moves back into circuit with line 170 to re-energize relay RA and emersion heaters J. Energization of relay RB also closes normally open contact RB1 to energize solenoid valve 240 in line 242 which is also connected through normally closed contact RF2 to line 220. Energization of solenoid valve 240 opens a valve in piping 30 to establish water flow through tube 24 of piercing element C. Hot water then flows through infusion package F, out the bottom openings in infusion package F as formed by piercing elements 98 and through outlet opening 102 of pan E to receptacle 16.

If there is no infusion package F on platform D, detector switch S will remain in circuit with line 243 which is connected in series with lines 244 and 218. Upon platform D reaching its uppermost position with no infusion package thereon, cam 128 moves switch LS1 from series circuit with line 184 to series circuit with line 245. When platform D started moving upward, switch LS2 moved from its circuit with line 252 into circuit with line 218 by action of cam 130. With no infusion package on platform D in the upper position thereof, a circuit is then established from line 172, through LS2, line 218, relays RG and RF, line 244, line 243, detector switch S, switch LS1, and line 182 to line 174. Energization of relay RG closes normally open contacts RG1 and RG2 in motor control circuit L so that motor H is energized to move platform D back to its lower position. As soon as platform D begins moving downward, switch LS1 moves back into circuit with line 184 by action of cam 128. Relays RF and RG remain energized to operate motor H by means of a holding circuit established by closing of normally open contact RF1 in line 220 when relays RF and RG were first energized. Relays RF and RG remain energized, and motor H continues to run, by means of the holding circuit from line 172, through switch LS2, line 218, relays RF and RG, contact RF1, and line 220 to line 174. When platform D reaches its lower position, cam 130 will move switch LS2 back into circuit with line 252 to de-energize relays RF and RG, and motor H will stop. The device is then ready for another cycle of operation. Detector switch S provides a means for automatically returning platform D to its lower position if it is started upward with no infusion package F thereon.

Infusion device A includes a sensing means M for sensing the volume of liquid which passes through infusion package F. In the arrangement shown, sensing means M is in the form of a probe extending down into receptacle 16. When a predetermined volume of liquid has flowed through infusion package F, the brewed beverage in receptacle 16 will contact sensing means M to close normally open contacts 246 and 248. This energizes relays RF and RG. Energization of relay RF opens normally closed contact RF2 in series with solenoid valve 240 so that solenoid valve 240 will be de-energized and flow of liquid through tube 24 of piercing element C will stop. Energization of relay RG closes normally open contacts RG1 and RG2 in motor control circuit L. Motor H is then energized from line 154 through line 188; from line 152 through line 190, closed normally open contact RG1, line 192, normally closed contact RI1 and line 194; from line 150 through line 196, closed normally open contact RG2, line 198, normally closed contact RI3 and line 202. Motor H does not reverse direction under normal operation, and energization of motor H when the flow of liquid has stopped to move platform D back down to the loading and unloading position of FIG. 2 causes rotation of motor H in the same direction as for moving platform D to the upward infusing position. Closing of contacts RG1 and RG2 causes motor H to rotate in a direction for driving gear 124 and cam 128 counterclockwise, and gear 126 and cam 130 clockwise. Cams 128 and 130 then simply rotate around 90° so that cam followers 70 and 72 move from high point portions 140 and 142 to low point portions 136 and 138 very rapidly. Initial movement of cam 128 will cause high point portion 140 to move away from actuator 230 of limit switch LS1 so that switch LS1 moves back to establish a circuit from line 182 to line 184 and de-energizes relay RB. Upon cam 130 reaching the position shown in FIG. 1, high point portion 142 of cam 130 will strike actuator 204 of limit switch LS2 and move switch LS2 to its open position in series with line 252.

Once a beverage has been brewed, switch LS2 maintains a circuit with line 252 through a momentary switch 254 operated by button 256 and connected in series with a hot water solenoid valve 258. This makes it possible to draw hot water from a spigot 259 on the front of infusion device A for making a different beverage such as tea or caffeine free coffee. Release of pressure on button 256 will open momentary switch 254 and de-energize solenoid valve 258.

Button 260 is also provided for operating a momentary switch 262 in series with cold water solenoid valve 264 for drawing cold water from spigot 259 as desired. Release of pressure on button 260 opens momentary switch 262 to de-energize cold water solenoid valve 264.

A relatively high temperature thermostat 270 is connected in series with transformer 158 and main on-off switch 162. In the event of a malfunction with normal control thermostat 168 for emersion heaters J, high temperature thermostat 270 will open to turn off all DC flowing to main control circuit K through transformer 158 and bridge circuit 166. At the same time, an indicator light 272 located behind an over temperature indicator button 274 will be lighted to warn the operator of a malfunction so the main -on-off switch can be opened.

Support 14 of infusion device A may also have a resistance heater 280 therebeneath to define a hotplate for keeping a brewed beverage hot. Resistance heater 280 is connected across line 152 and neutral line 160 in series with normally open switch 282 which may be closed by button 284 on the front of infusion device A. It will be recognized that all of the control buttons located on the front of infusion device A may be translucent and have neon indicator bulbs located therebehind, and connected in the circuit of FIG. 9 to indicate which buttons have been depressed.

In the event of a malfunction after platform D has reached its fully raised infusing position shown in FIG. 4, such as leakage or bursting of infusion package F or other malfunction, it is possible to immediately stop flow of liquid through tube 24 of piercing element C and move platform D back to its loading and unloading position shown in FIG. 2. With platform D in its fully raised position, switch LS1 establishes a circuit through line 232 to energize relay RB. Normally open contacts RB1 and RB2 will then be closed and solenoid valve 240 in line 242 will be open for supplying liquid through tube 24 of piercing element C. Switch LS2 will be in its normally closed position establishing a circuit through line 218 with relays RF and RG. In the event of a malfunction, the operator pushes button 212 which closes momentary contacts 214 and 215. Switch LS1 is moved out of series connection with line 184 so that closing of momentary switch 214 will not energize relays RH and RI. However, closing of contact 215 will energize relays RF and RG. This immediately opens normally closed contact RF2 and closes normally open contact RF1. Release of button 212 will cause momentary switch 215 to open but relays RF and RG remain energized through the holding circuit established by closed normally open contact RF1. Immediately upon energization of relay RF, normally closed contact RF2 opens to deenergize solenoid valve 240 which then moves to the closed position and stops flow of liquid through tube 24 of piercing element C. Energization of relay RG will also close normally open contacts RG1 and RG2 in motor control circuit L which then establish the circuits previously described to energize motor H and rotate cams 128 and 130 back to a position in which cam followers 70 and 72 rest on low point portions 136 and 138. Once cams 128 and 130 are rotated back to their normal positions in which platform D is at the loading and unloading position shown in FIG. 2, cam 130 will strike actuator 204 of limit switch LS2 and move LS2 out of series circuit with line 218 containing relays RF and RG. Relays RF and RG will then be de-energized to stop motor H by opening of normally open contacts RG1 and RG2. Initial movement of platform D downward from its upward infusing position also causes switch LS1 to move out of series circuit with line 232 and back into series circuit with line 184 so that relay RB is de-energized to open normally open contacts RB1 and RB2.

It will be recognized that sensing means M may take many different forms, such as a scale type of device on support 14 to weigh the volume of liquid which has been received in receptable 16, or a float type of control which extends down into receptacle 16 for actuation upon a brewed beverage reaching a desired level in receptacle 16. In any event, whatever form sensing means M takes, the sensing means is responsive to a predetermined volume of liquid which has passed through infusion package F. Whether the sensing means measures weight or level of liquid in receptacle 16, it is still a means which measures a predetermined volume of liquid which has flowed past infusion package F. It will be recognized that the circuit of FIG. 9 defines a control means for selectively energizing the power means defined by motor H for moving platform D between its upper infusing position, and its lower loading and unloading position. The control circuit of FIG. 9 also includes an automatic sensing means M which senses a predetermined voluem of liquid which has passed infusion station G, and is responsive to flow of such predetermined volume of liquid past infusion station G to energize the power means defined by motor H for moving platform D from its upper infusing position back to its loading and unloading position. The control circuit of FIG. 9 further performs the dual functions of selectively operating both solenoid valve 240 and motor H. The control circuit is operative upon movement of platform D to its upper infusing position to open valve 240 by movement of limit switch LS1 into circuit with relay RB and to de-energize motor H by movement of limit switch LS1 out of circuit with relays RC and RD. Sensing means M is then operative upon flow of a predetermined volume of liquid past infusion station G to open solenoid valve 240. It will be recognized that infusion package F will normally be defined by a can containing an infusion beverage. The upper position of platform D shown in FIG. 4 defines a can piercing position while the lower position of platform D shown in FIG. 2 defines a can loading and unloading position.

While the present invention has been described with reference to a preferred embodiment, it is bovious that modifications and alterations will occur to others skilled in the art upon the reading and understanding of this specification. The present invention includes all such obvious modifications and alterations, and equivalents thereof, and is limited only by the scope of the claims.

Having thus described our invention, we claim:

1. In an infusion device for making a beverage, an infusion station for receiving an infusion package, said infusion station including a pair of spaced-apart package engaging members, at least one of said members being movable toward the other of said members to an infusing position and away from the other of said members to a package loading and unloading position, power means for selectively moving at least said one member between said infusing position and said loading and unloading position, and liquid supply means for feeding liquid to said infusion station when said one member is in said infusing position, the improvement comprising; control means for selectively energizing said power means, said control means including automatic sensing means for sensing a predetermined volume of liquid which has passed said infusion station and being responsive to said predetermined volume of liquid to energize said power means for moving said one member to said loading and unloading position.

2. The device of claim 1 wherein said one member comprises a substantially horizontal package supporting platform and said other member is positioned above said platform.

3. The device of claim 2 wherein only one of said members is movable toward and away from the other of said members and said one member is defined by said platform, said platform being vertically movable toward and away from said other member by said power means.

4. The device of claim 3 wherein said power means includes rotatable cam means and motor means for rotating said cam means, cam follower means on said platform for cooperating with said cam means to selectively raise and lower said platform when said cam means is selectively rotated by said power means.

5. The device of claim 4 wherein said control means including manual switch means for energizing said motor to rotate said cam means for raising said platform, and said sensing means energizes said motor to rotate said cam means for lowering said platform.

6. The device of claim 4 wherein said cam means comprises a pair of spaced apart cams mounted on a substantially horizontal axis on opposite sides of said platform, said platform including a pair of spaced apart upstanding arms, said cam follower means including a cam follower on each of said arms.

7. The device of claim 6 wherein said beverage brewing device has a support frame and said motor means is mounted on said frame rearwardly of said can support, a drive shaft rotatably mounted on said frame rearwardly of said platform, said pair of cams being mounted on separate shafts for independent rotation, driven gear means connected with each of said cams, said drive shaft having a pair of spaced apart gears thereon drivingly engaged with each of said driven gear means, and said motor means being drivingly connected with said shaft means.

8. The device of claim 7 wherein said control means including manual switch means for energizing said motor to rotate said cams for raising said can support, and said sensing means energizes said motor to rotate said cam means for lowering said can support.

9. The device of claim 1 wherein said liquid supply means includes valve means movable between open and closed positions for opening and closing said liquid supply means, said control means being for selectively operating said valve means as well as for selectively energizing said power means, said control means being responsive to movement of said one member to said infusing position to open said valve means and de-energize said power means, said sensing means being responsive to said predetermined volume of liquid to close said valve means.

10. The device of claim 9 wherein said one member comprises a substantially horizontal platform and said other member is positioned above said can support.

11. The device of claim 10 wherein only one of said members is movable toward and away from the other of said members and said one member is defined by said platform, said platform being vertically movable toward and away from said other member by said power means.

12. The device of claim 1 wherein said package engaging members are positioned in vertically space relationship and comprise upper and lower members.

13. The device of claim 12 wherein said lower member comprises a substantially horizontal platform and only said platform is movable toward and away from said upper member.

14. The device of claim 13 wherein said power means includes rotatable cam means and electric motor means for rotating said cam means, and cam follower means on said platform for cooperation with said cam means to selectively raise and lower said platform when said cam means is selectively rotated by said motor.

15. The device of claim 14 wherein said control means includes manual switch means for energizing said motor to rotate said cam means for raising said platform, and said sensing means energizes said motor to rotate said cam means for lowering said platform.

16. The device of claim 1 wherein said power means includes an electric motor, said control means including manual switch means for energizing said motor to rotate to move said one member to said infusing position, and said sensing means energizes said motor to rotate to move said one member to said loading and unloading position.

17. The device of claim 1 wherein said control means includes detector means for detecting an infusion package in said infusing position of said one member and stopping operation of said device in the absence of an infusion package in said device.

18. In a beverage brewing device including a support frame, can piercing means on said frame, a can support platform movably mounted on said frame for movement toward and away from said piercing means, an electric motor mounted on said frame and drivingly connected with said can support for moving said can support toward said piercing means to a can piercing position and away from said piercing means to a can loading and unloading position, liquid supply means for feeding liquid to a can positioned on said can support when said can support is in said piercing position, and control means for selectively energizing said motor, said control means including manual switch means for energizing said motor to rotate for driving said can support to said can piercing position, switch means operated by said can support reaching said piercing position for de-energizing said motor, and sensing means responsive to a predetermined volume of liquid which has passed a can positioned on said can support when said can support is in said piercing position for energizing said motor for driving said can support to said loading and unloading position.

19. In a beverage brewing device including a support frame, can piercing means on said frame, a can support platform movably mounted on said frame below said piercing means for vertical movement toward and away from said piercing means, electric motor means mounted on said frame and drivingly connected with said can support for selectively moving said can support upward toward said piercing means to a can piercing position and away from said piercing means to a can loading and unloading position.

20. The device of claim 19 and further including control means for controlling said device, said control means including detector means for detecting a can on said platform in said can piercing position of said platform and stopping operation of said device in the absence of a can on said platform.

21. The device of claim 19 and further including cam means rotatably mounted on said frame and cam follower means mounted on said can support, said motor being drivingly connected with said cam means and said cam follower means cooperatively engages said cam means to selectively raise and lower said can support when said cam means is selectively rotated by said motor.

22. The device of claim 21 wherein said cam means comprises a pair of spaced apart cams rotatably mounted on said frame on a substantially horizontal axis on opposite sides of said can support, said can support including a pair of spaced apart upstanding arms, said cam follower means including a cam follower on each of said arms, each of said cam followers on each of said arms cooperating with one of said cams.

23. The device of claim 22 wherein said motor is mounted on said frame rearwardly of said can support, a drive shaft rotatably mounted on said frame rearwardly of said can support, driven gear means connected with each of said cams, said drive shaft having a pair of spaced apart gears thereon drivingly engaged with said driven gear means, and said motor being drivingly engaged with said shaft.

24. The device of claim 19 wherein said motor is reversible and rotates in a common direction for moving said can support to said piercing position and to said loading and unloading position during normal operation of said device, and control means including selectively operable switch means for energizing said motor to rotate in an opposite direction in the event of a malfunction prior to said can support reaching said piercing position for moving said can support to said loading and unloading position.

25. The device of claim 19 and further including control means for selectively energizing said motor, said control means including manual switch means for energizing said motor to rotate for moving said can support upward, switch means responsive to said can support reaching said piercing position for de-energizing said motor, and automatic sensing means responsive to a physical condition of said brewing device for energizing said motor to rotate for moving said can support to said can loading and unloading position.

26. In an infusion device for making a beverage, an infusion station for receiving an infusion package, said infusion stain including a pair of spaced apart package engaging members, at least one of said members being movable toward the other of said members to an infusing position and away from the other of said members to a package loading and unloading position, power means for selectively moving at least said one member between said infusing position and said loading and unloading position, liquid supply means for feeding liquid to said infusion station when said one member is in said infusing position, valve means movable between open and closed positions for opening and closing said liquid supply means, control means for selectively energizing said power means and operating said valve means, said control means including manual switch means for energizing said power means to move said one member to said infusing position, operating means responsive to movement of said one member to said infusing position for de-energizing said power means and opening said valve means, and automatic sensing means for sensing a predetermined volume of liquid which has passed said infusion station, said sensing means being responsive to said predetermined volume of liquid for closing said valve means and energizing said power means to move said one member to said loading and unloading position.

27. The device of claim 26 and further including heating means for heating liquid from said liquid supply means, and temperature sensing means for sensing the temperature of said liquid, said operating means being connected with said temperature sensing means for opening said valve means only when said temperature sensing means senses a predetermined temperature.

28. In an infusion device for making a beverage, an infusion station for receiving an infusion package, said infusion station including a pair of spaced apart package engaging members, at least one of said members being movable toward the other of said members to an infusing position and away from the other of said members to a package loading and unloading position, power means for selectively moving at least said one member between said infusing position and said loading and unloading position, and control means for operating said device, said control means including detector means for detecting an infusion package in said infusing position of said one member and for stopping operation of said device in the absence of an infusion package.

29. The device of claim 28 wherein said control means comprises an electrical control circuit and said detector means comprises normally open switch means in said circuit on said device, said normally open switch means being movable to a closed position by contact with an infusion package in said infusing position of said one member.

30. The device of claim 28 wherein said detector means energizes said power means to move at least said one member to said loading and unloading position in the absence of an infusion package in said infusion station.

* * * * *